UNITED STATES PATENT OFFICE.

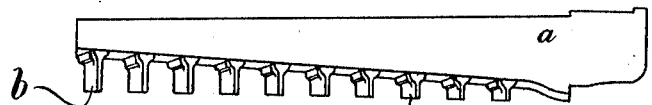
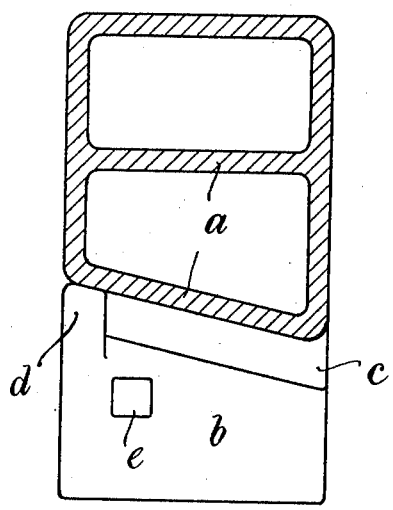
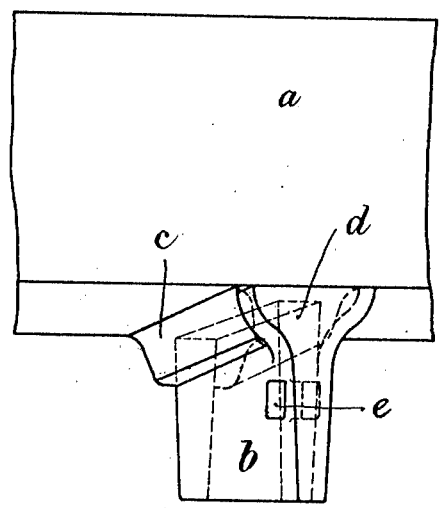
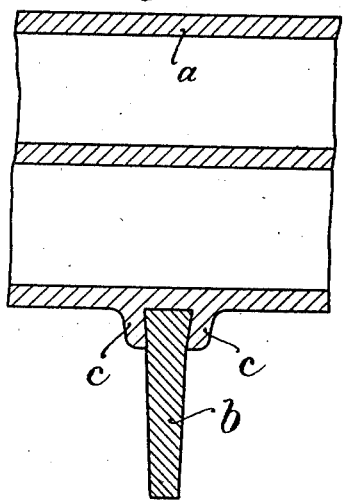
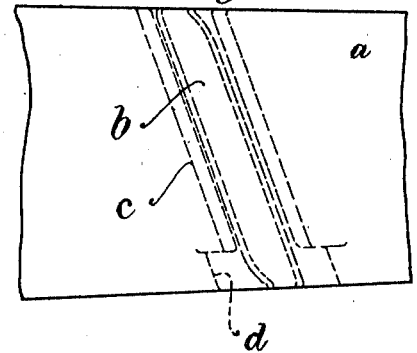

MAURICE van MARCKE de LUMMEN, OF COLOGNE, GERMANY.

AGITATING OR STIRRING DEVICE FOR USE IN MECHANICAL ROASTING-FURNACES.

1,061,303. Specification of Letters Patent. Patented May 13, 1913.

Application filed June 11, 1912. Serial No. 702,952.

*To all whom it may concern:*

Be it known that I, MAURICE VAN MARCKE DE LUMMEN, a subject of the King of Belgium, residing at Cologne-on-the-Rhine, Germany, have invented new and useful Improvements in or Relating to Agitating or Stirring Devices for Use in Mechanical Roasting-Furnaces, of which the following is a specification.

This invention relates to stirring or agitating devices for mechanical roasting furnaces and more particularly to a mode of arranging and securing the teeth on the agitating arms, so as to enable the individual teeth to be singly detached from or secured on the arm and in this way be readily exchanged if necessary.

In contra-distinction to known devices of this kind the present invention is distinguished particularly by its simplicity and by the stability and rigidity which the teeth present after being attached.

The characteristic feature of the invention consists in the provision on the lower or under face of each agitating arm of faces obliquely rising in the direction of rotation, and of an obliquely rising guide for each individual tooth thereon. The tooth which is loosely inserted in this guide is thus forced against the under face of the agitating arm by the counter pressure exerted by the roasting material and thereby is safely and firmly secured in position. In order to exchange a tooth it is only necessary to withdraw it for instance by means of a hook shaped tool engaging with a notch or opening in the tooth and this may be effected if desired even during the working.

A preferable form of the invention is shown by way of example in the accompanying drawings in which—

Figure 1 shows a lateral view of an agitating arm of this kind with the teeth in proper position. Fig. 2 is a cross section of the arm on a larger scale and showing a tooth in position thereon. Fig. 3 is a front view of Fig. 2 and showing a tooth and the invention in perspective view. Fig. 4 shows a longitudinal section of a portion of the agitating arm and the tooth in transverse section and Fig. 5 shows a top plan view of Fig. 3.

As shown particularly in Fig. 2 each agitating arm $a$ has its lower face constructed in the form of an oblique surface rising in the direction of rotation. For each individual tooth $b$ the lower face of the agitating arm is provided with a correspondingly rising guide $c$, the lateral inner faces of which are slightly dove-tailed. In these guides $c$ the downwardly tapering teeth $b$ are loosely inserted, the dove-tailed faces in the guides $c$ preventing the teeth from dropping out. Each tooth is provided with a forwardly located abutment $d$ bearing against corresponding projections on the guides $c$ thereby preventing the tooth from slipping through the guide and from tilting therein. During the rotation of the agitating arm the individual teeth $b$ are firmly pressed against the under face thereof by the counter pressure of the roasting material and in this way are securely held in position without the aid of any particular securing device. Moreover each tooth can be easily detached from the agitating arm and quickly exchanged without any difficulty. As shown in Figs. 2 and 3 each tooth $b$ is also provided with an opening or hole $e$ for the purpose of enabling a hook shaped tool or the like to be inserted therein so that the tooth may be readily and quickly withdrawn and exchanged if necessary even during the working of the device.

Having now particularly described and ascertained the nature of my said invention and in what manner the same is to be performed, I declare that what I claim is:—

1. In roasting furnaces or the like, in combination, an agitating arm, guides thereon inclined to the horizontal and teeth detachably supported in said guides.

2. In roasting furnaces or the like, in combination, an agitating arm, guides thereon, said guides being inclined upwardly from the rear to the front of said arm and teeth detachably supported in said guides.

3. In roasting furnaces or the like, in combination, an agitating arm, guides thereon inclined to the horizontal and teeth slidingly mounted in said guides, each of said teeth being provided with means to limit its sliding movement with respect to said guides.

In testimony whereof I have signed my name to this specification in the presence of two subscribing witnesses.

MAURICE van MARCKE de LUMMEN.

Witnesses:
 Louis Vandory,
 Bessie F. Dunlap.

Copies of this patent may be obtained for five cents each, by addressing the "Commissioner of Patents, Washington, D. C."